(12) United States Patent
Nonaka et al.

(10) Patent No.: US 9,088,700 B2
(45) Date of Patent: Jul. 21, 2015

(54) IMAGING DEVICE, AND SYSTEM FOR AUDIO AND IMAGE RECORDING

(75) Inventors: Osamu Nonaka, Tokyo (JP); Yuichi Tsuchimochi, Tokyo (JP)

(73) Assignee: OLYMPUS CORPORATION (JP)

( * ) Notice: Subject to any disclaimer, the term of this patent is extended or adjusted under 35 U.S.C. 154(b) by 631 days.

(21) Appl. No.: 13/038,030

(22) Filed: Mar. 1, 2011

(65) Prior Publication Data

US 2011/0221910 A1    Sep. 15, 2011

(30) Foreign Application Priority Data

Mar. 9, 2010 (JP) ................................. 2010-051990

(51) Int. Cl.
*H04N 1/21* (2006.01)
*H04N 5/77* (2006.01)
*H04N 9/82* (2006.01)

(52) U.S. Cl.
CPC ............... *H04N 1/2112* (2013.01); *H04N 5/77* (2013.01); *H04N 9/8227* (2013.01)

(58) Field of Classification Search
None
See application file for complete search history.

(56) References Cited

U.S. PATENT DOCUMENTS

| 5,812,736 | A  | * | 9/1998  | Anderson       | 386/324    |
|-----------|----|---|---------|----------------|------------|
| 6,334,025 | B1 | * | 12/2001 | Yamagami       | 386/241    |
| 6,594,442 | B1 | * | 7/2003  | Kageyama et al.| 386/253    |
| 6,778,760 | B1 | * | 8/2004  | Kagle          | 386/201    |
| 7,669,131 | B2 | * | 2/2010  | Matsuyama      | 715/730    |
| 2002/0021361 | A1 | * | 2/2002 | Kitajima et al. | 348/232 |
| 2003/0202004 | A1 | * | 10/2003 | Lin           | 345/716    |
| 2004/0205477 | A1 | * | 10/2004 | Lin           | 715/500.1  |
| 2006/0114329 | A1 | * | 6/2006 | Sakamoto et al. | 348/207.99 |
| 2009/0010615 | A1 | * | 1/2009 | Kawahara et al. | 386/96   |
| 2009/0119251 | A1 | * | 5/2009 | Ono           | 707/3      |

FOREIGN PATENT DOCUMENTS

JP    2000-347322 A    12/2000

* cited by examiner

*Primary Examiner* — Justin P Misleh
(74) *Attorney, Agent, or Firm* — Volpe and Koenig, P.C.

(57) ABSTRACT

An imaging device includes an interface, a controller, and a recorder. The interface is connected to an external device. The interface is configured to receive divided audio data obtained by dividing data included in an audio file obtained by the external device in units of time, from the external device. The controller performs correlating an image file with the divided audio data so that the image file and divided audio data are synchronized, based on time data of the image file obtained by image shooting, and time data of the divided audio data. The controller performs sending reduced image data obtained by reducing images included in the image file, to the external device through the interface. The recorder records the image file and divided audio data.

6 Claims, 4 Drawing Sheets

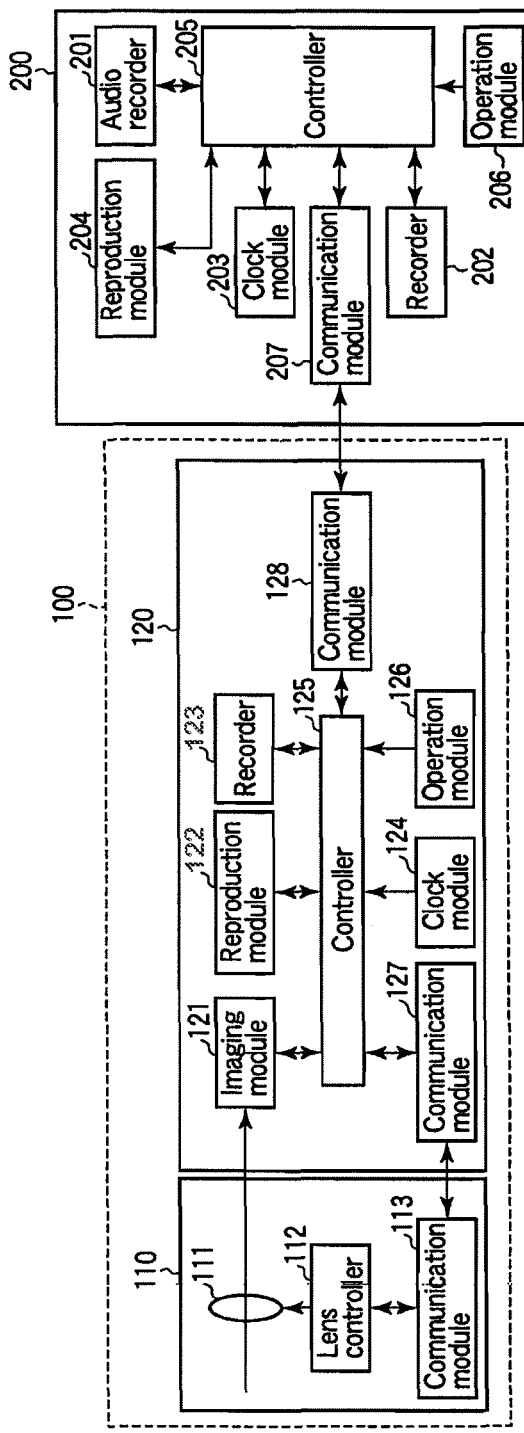
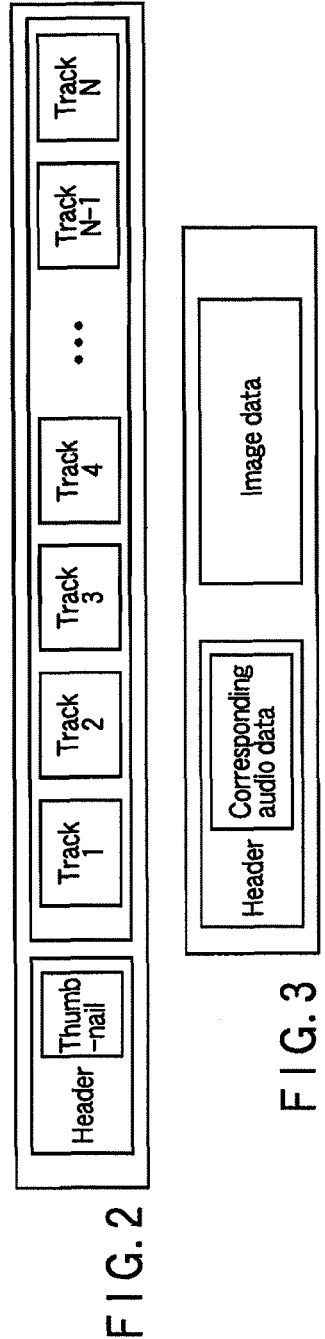
FIG. 1
FIG. 2
FIG. 3

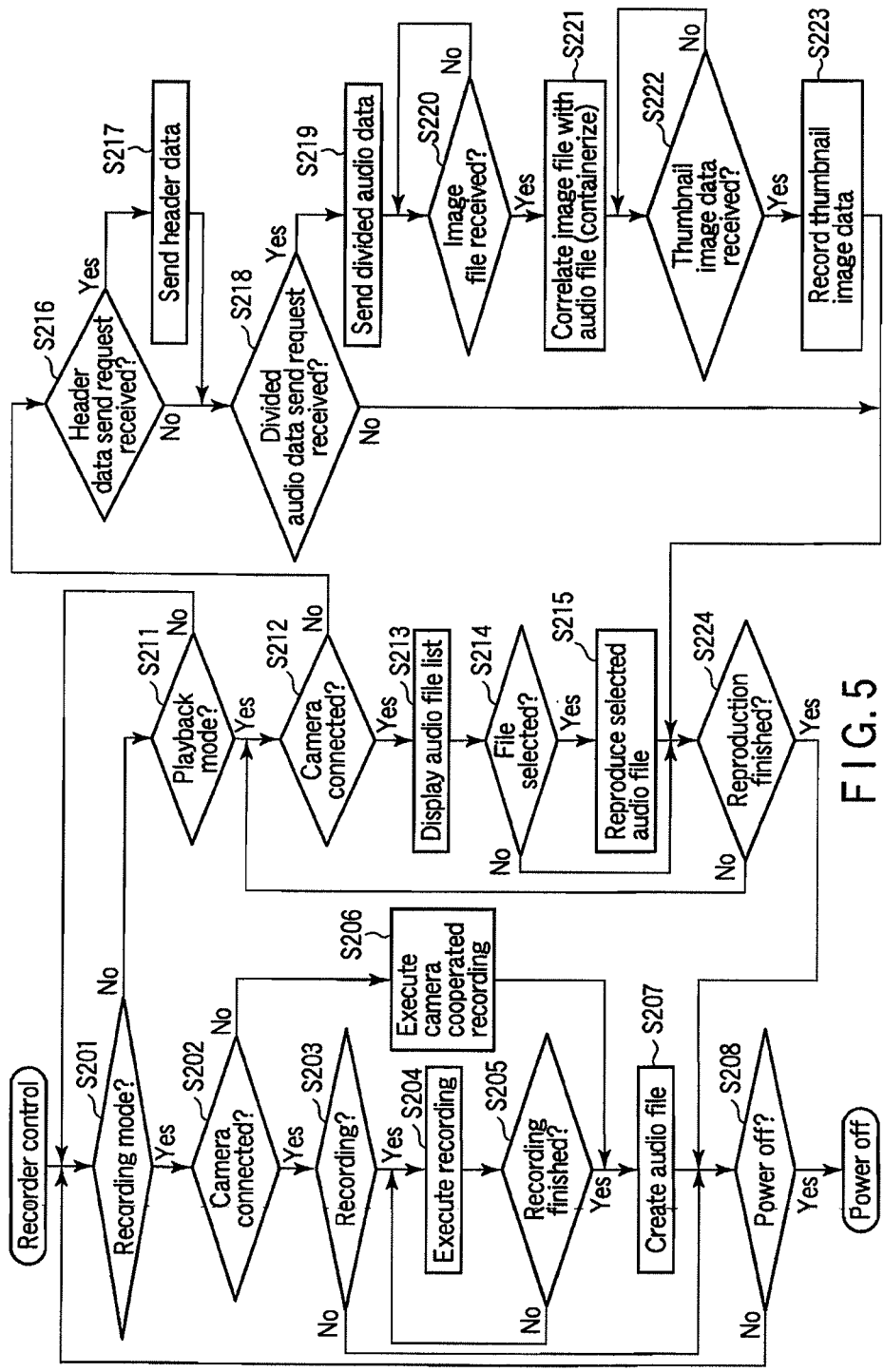
F I G. 5

IMAGING DEVICE, AND SYSTEM FOR AUDIO AND IMAGE RECORDING

CROSS-REFERENCE TO RELATED APPLICATIONS

This application is based upon and claims the benefit of priority from prior Japanese Patent Application No. 2010-051990, filed Mar. 9, 2010, the entire contents of which are incorporated herein by reference.

BACKGROUND OF THE INVENTION

1. Field of the Invention

The invention relates to an imaging device connected to an audio recording device, and a system comprising an imaging device and an audio recording device.

2. Description of the Related Art

Various ideas are proposed to cooperate an imaging device (camera) to obtain image data with an external device (IC recorder) to obtain audio data. For example, in Jpn. Pat. Appln. KOKAI Publication No. 2000-347322, identification data is added to audio data to identify a relationship to image data. This makes it possible to correlate image data with audio data obtained by cooperation between a camera and an IC recorder.

BRIEF SUMMARY OF THE INVENTION

According to a first aspect of the invention, there is provided an imaging device comprising: an interface which is connected to an external device, and is configured to receive divided audio data obtained by dividing data included in an audio file obtained by the external device in units of time, from the external device; a controller configured to perform the followings: (1) correlating an image file with the divided audio data so that the image file and divided audio data are synchronized, based on time data of the image file obtained by image shooting, and time data of the divided audio data, and (2) sending reduced image data obtained by reducing images included in the image file, to the external device through the interface, and a recorder configured to record the image file and divided audio data.

According to a second aspect of the invention, there is provided a system for image recording and audio recording, comprising: an imaging device configured to record an image file; an audio recording device configured to record an audio file including a plurality of divided audio data obtained by dividing temporally-continued audio data; an interface connected to the imaging device and audio recording device; a first controller configured to correlate an image file with divided audio data so that the image file and divided audio data are synchronized, based on time data of the image file, and time data of the divided audio data; a second controller configured to create a container file by correlating the image file with the audio file, based on the time data of the image file, and the time data of the audio file; a first recorder which adds correlated data of the image file and divided audio data to the image file, and records the image file; and a second recorder configured to record the container file.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing a system configuration of an audio/image recording system according to an embodiment;

FIG. 2 is a diagram showing a format of an audio file recorded in an IC recorder according to the embodiment;

FIG. 3 is a diagram showing a format of an image file recorded in a camera according to the embodiment;

FIG. 5 is a flowchart of control of the IC recorder of the system according to the embodiment;

DETAILED DESCRIPTION OF THE INVENTION

Figure 4:
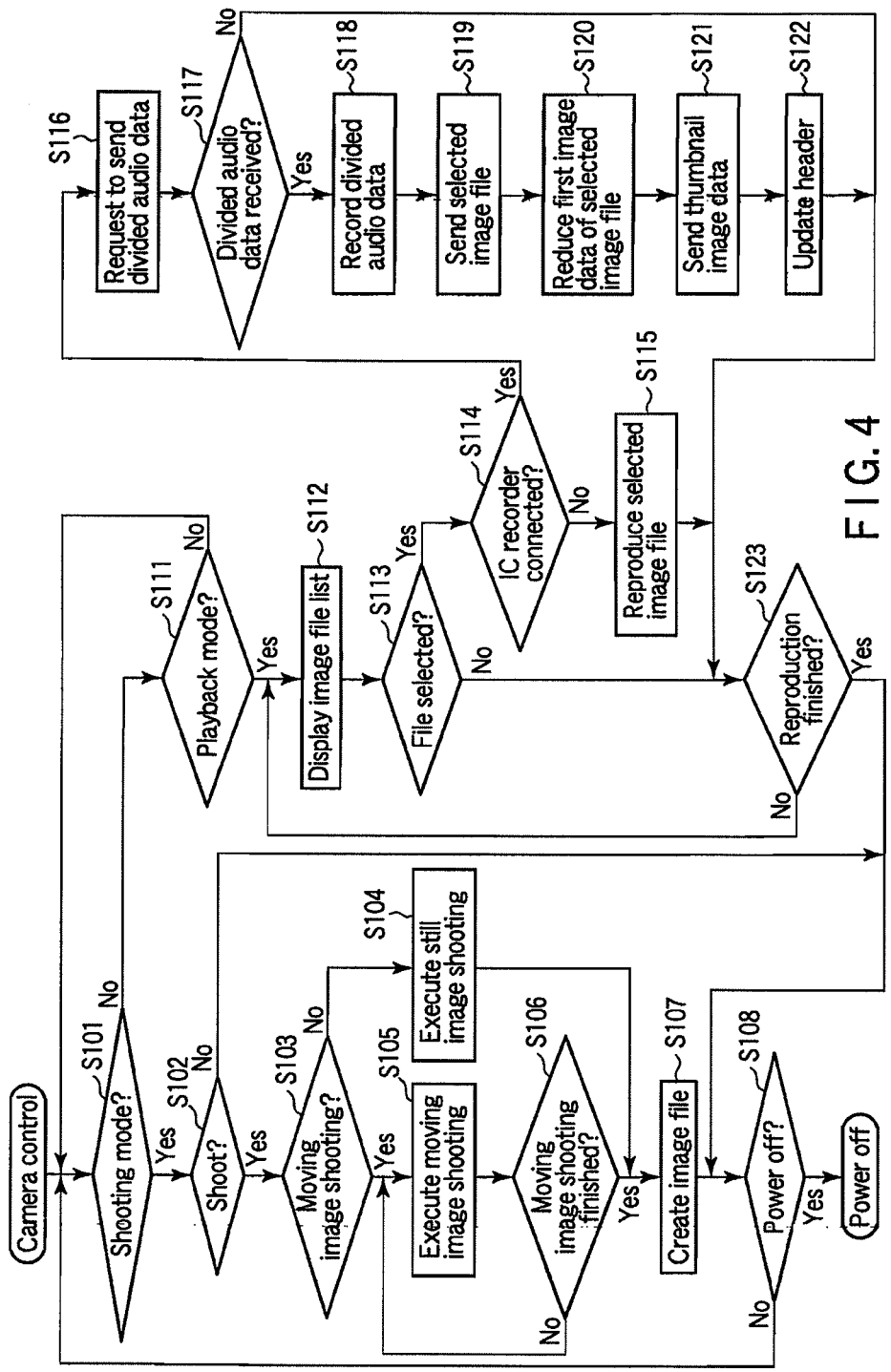
FIG. 4 is a flowchart of control of the camera of the system according to an embodiment.

Hereinafter, embodiments will be explained with reference to the accompanying drawings.

FIG. 1 shows a configuration of a system according to an embodiment. The system shown in FIG. 1 comprises an imaging device (camera) 100, and an audio recording device (IC recorder 200). FIG. 1 shows the camera 100 and IC recorder 200 as separate units. The technology of the embodiment is applicable to a configuration, in which the camera 100 is given an audio recording function.

The camera 100 shown in FIG. 1 comprises an interchangeable lens 110, and a main body 120. The interchangeable lens 110 is detachable from the main body 120. FIG. 1 shows the camera 100 as a camera with interchangeable lenses. However, the camera 100 may not be a camera with interchangeable lenses.

The interchangeable lens 110 comprises an imaging lens 111, a lens controller 112, and a communication module 113.

The imaging lens 111 leads luminous flux (image data) from a not-shown subject into an imaging module 121 in the main body 120. The lens controller 112 is communicable with the main body 120 through the communication module 113. The lens controller 112 controls the imaging lens 111, such as focusing and zooming, according to a lens control signal from the main body 120. The communication module 113 is an interface for the lens controller 112 to make communication with main body 120.

The main body 120 comprises an imaging module 121, a reproduction module 122, a recorder 123, a clock module 124, a controller 125, an operation module 126, a communication module 127, and a communication module 128.

The imaging module 121 photoelectrically converts luminous flux (image information) coming into through the imaging lens 111, thereby obtaining image data. The reproduction module 122 comprises a display such as a liquid crystal display, and an audio reproduction module such as a speaker. The reproduction module 122 displays various images based on the image data obtained by the imaging module 121, and reproduces audio data sent from the IC recorder 200. The recorder 123 is a flash memory, for example. The recorder 123 records various data such as an image file obtained by the imaging module 121 and processed by the controller 125. The clock module 124 measures various times (date and time) such as a shooting time.

The controller 125 controls the operations of the component modules of the main body 120. The controller 125 processes image data obtained by the imaging module 121, for example, compressing the data. The operation module 126 is used by a user to give various instructions to the main body 120. When the operation module 126 is operated, the controller 125 executes various operations according to the operation contents of the operation module 126.

The communication module 127 is an interface for the controller 125 to make communication with the interchangeable lens 110. The communication module 128 is connected to the IC recorder 200 directly or through a wire. The communication module 128 may be wirelessly connected to the IC recorder 200.

The IC recorder 200 comprises an audio recorder 201, a recorder 202, a clock module 203, a reproduction module 204, a controller 205, an operation module 206, and a communication module 207.

The audio recorder 201 includes a microphone. The audio recorder 201 obtains audio data by converting externally input audio data into an electrical signal. The recorder 202 is a flash memory, for example. The recorder 202 records various data such as an audio file obtained by the audio recorder 201 and processed by the controller 205. The clock module 203 measures various times (date and time) such as a recording time. The reproduction module 204 includes a speaker and a display. The reproduction module 204 reproduces an audio file recorded in the recorder 200 by converting it into audio data, and displays various images.

The control module 205 controls the operations of the component modules of the IC recorder 200. The control module 205 processes, for example, compressing audio data obtained by the audio recorder 201. The operation module 206 is used by the user to give various instructions to the IC recorder 200. When receiving an operation instruction through the operation module 206 or receiving an operation signal through the communication module 207, the controller 205 executes various operations according to the operation instruction. The communication module 207 is an interface for the controller 205 to make communication with the main body 120. The communication module 207 may be wirelessly connected to the main body 120. It is possible to record audio data in the state that the IC recorder and main body 120 are being set to be communicable through the communication module 207 and the communication module 128 of the main body 120.

FIG. 2 shows a format of an audio file recorded in the IC recorder 200 of the embodiment. As shown in FIG. 2, in the embodiment, an audio file including a plurality of minutely divided audio data (divided audio data) is recorded. Such an audio file comprises a header and an audio data part. The header includes a recording time, and a thumbnail data indicating a relationship to image data. The audio data part is divided into a plurality of tracks, and each track stores minute time audio data (divided audio data). A condition to divide into tracks, or the amount of audio data stored in each track, may be a certain time (seconds), or a certain recording capacity (bytes). The number of tracks may be constant (e.g., 100).

Further, the amount of data stored in each track may be changeable. These conditions can be set by the operation module 206 of the IC recorder 200. When the operation module 206 is not operated, a fixed initial value may be set. If the camera 100 is connected to the IC recorder 200, they may be operated by the operation module 126 of the main body 120. A dividing condition in divided recording mode is recorded in the header. In this configuration, the amount of data stored in each track can be known by reading the header data.

FIG. 3 shows a format of an image file recorded in the camera 100 of the embodiment. An image file in the embodiment comprises a header, and an image data part. The header records an audio data recording start time (shooting start time) and a recording end time (shooting end time), and audio data related to one or more divided audio data corresponding to the audio data recorded in the audio data part. The corresponding audio data includes data indicating a first track and end track of divided audio data corresponding to image data, for example. For example, if divided audio data is present in 1 to 100 tracks, and divided audio data corresponding to image data is present in 50 to 60 tracks, 50 and 60 are recorded as corresponding audio data. As the corresponding audio data, a start time, end time, and playback time of the divided audio data corresponding to image data may be recorded. Further, the divided audio data corresponding to image data may be specified for each track, and recorded as corresponding audio data.

Control of the camera 100 is explained with reference to FIG. 4. Operation mode of the camera 100 is set by the user through the operation module 126. The controller 125 determines whether the operation mode is imaging mode (S101). If the operation mode is imaging mode, the controller 125 determines whether the user has issued an instruction to start shooting through the operation module 126 (S102). If the user has not issued an instruction to start shooting, step S108 is executed. If the user has issued an instruction to start shooting, the controller 125 determines whether to execute moving image shooting or still image shooting (S103). If still image shooting is determined, the controller 125 operates the imaging module 121 to execute still image shooting to obtain still image data (S104). After the still image shooting, step S107 is executed. If moving image shooting is determined, the controller 125 continuously operates the imaging module 121 to execute image shooting to obtain moving image data (S105). During the moving image shooting, the controller 125 determines whether the user has issued an instruction to finish the shooting through the operation module 126 (S106). If the user has not issued an instruction to finish the shooting, step S105 is executed, and the moving image shooting is continued. If the user has issued an instruction to finish the shooting, step S107 is executed.

After finishing the still image or moving image shooting, the controller 125 creates an image file according to the format shown in FIG. 3, and records the created image file in the recorder 123 (S107).

In this case, a header of an image file records data such as a shooting start/end time. The data is associated later with the recording data of the IC recorder 200. In the case of still image shooting, the shooting start time and end time are substantially the same. Thus, if the range of corresponding divided audio data is not reserved for a certain period, the audio data may become meaningless. It is therefore desirable to take a certain allowance in the actual shooting start time, and to set it as a true shooting start time.

After creating an image file, the controller 125 determines whether the user has issued an instruction to turn off the power through the operation module 126 (S108). If the user has issued an instruction to turn off the power, the controller 125 finishes the camera control. If the user has not issued an instruction to turn off the power, step S101 is executed.

If the operation mode of the camera 100 is not shooting mode (S111), the controller 125 determines whether the operation mode of the camera 100 is playback mode (S111). If the operation mode is not playback mode, step S101 is executed. If the operation mode is playback mode, the controller 125 causes the reproduction module 122 to display an image file list recorded in the recorder 123 (S112). After the image file list is displayed, the controller 125 determines whether the user selects an image file through the operation module 126 (S113). If the user does not select an image file, step S123 is executed. If the user selects an image file, the controller 125 determines whether the IC recorder 200 is connected according to the state of the communication module 128 (S114). If the IC recorder 200 is not connected, the controller 125 reads the selected image file from the recorder 123, and causes the reproduction module 122 to play back the image based on the read image file (S115). In this case, if divided audio data correlated to the image data has been recorded in the recorder 123, the controller 125 plays back also the divided audio data simultaneously with the playback of the image data in step S115.

If the IC recorder 200 is connected, the controller 125 requests the IC recorder 200 to send the divided audio data correlated to the image file selected in step S113 (S116). In this case, the controller 125 requests the IC recorder 200 to send the recording start/end time, and the time per one track (or the total track number). The controller 125 compares the data sent from the IC recorder 200 with the shooting start/end time corresponding to the selected image file, and identifies the divided audio data correlated to the selected image file. Then, the controller 125 requests the IC recorder 200 to send the divided audio data. After requesting the divided audio data be sent, the controller 125 determines whether the divided audio data has been received (S117). If the correlated divided audio data has not been received, step S123 is executed. If the correlated divided audio data has been received, the controller 125 records the received divided audio data in the recorder 123 (S118). Then, the controller 125 sends the selected image file to the IC recorder 200 (S119). Further, the controller 125 reduces first image data in the selected image file, and generates a thumbnail image data (S120). In the case of a still image file, the first image data is the image data itself stored in the selected image file. If the image file is a still image file, it is unnecessary to select an image file to generate a thumbnail image data. The controller 125 sends thumbnail image data to the IC recorder 200 (S121). After sending the thumbnail image data, the controller 125 stores data such as the recording start/end time of the received divided audio data, and the time per one track (or the total track number) in the header of the selected image file, and updates the header (S122). Thereafter, step S123 is executed.

In step S123, the controller 125 determines whether the user has issued an instruction to finish the reproduction through the operation module 126 (S123). If the user has not issued an instruction to finish the reproduction, step S112 is executed. If the user has issued an instruction to finish the reproduction, step S108 is executed.

The control of the IC recorder 200 is explained with reference to FIG. 5. The user sets an operation mode of the IC recorder 200 by operating the operation module 206. The controller 205 determines whether the operation mode is recording mode (S201). If the operation mode is recording mode, the controller 205 determines whether the main body 120 of the camera 100 is connected according to the state of the communication module 207 (S202). If the main body 120 is not connected, the controller 205 determines whether the user has issued an instruction to start recording through the operation module 206 (S203). If the user has not issued an instruction to start recording, step S208 is executed. If the user has issued an instruction to start recording, the controller 205 operates the audio recorder 201 to record audio data (S204). During the recording, the controller 205 determines whether the user has issued an instruction to finish the recording through the operation module 206 (S205). If the user has not issued an instruction to finish the recording, step S204 is executed, and the recording is continued. If the user has issued an instruction to finish the recording, step S207 is executed. If the main body is connected, the controller 205 cooperates with the camera 100 to execute recording (S206). If the camera 100 executes image shooting, the controller 205 starts recording simultaneously with a shooting start instruction, and finishes recording simultaneously with a shooting end instruction. If the camera executes still image shooting, the controller 205 starts recording at the instant the connection of the camera 100 is detected, and finishes recording simultaneously with a shooting end instruction. In the cooperative recording, if the amplitude and frequency of an audio signal are substantially constant, recording may be continued, and one divided audio data may be recorded. This prevents interruption of a series of audio data while recording.

After the recording is finished, the controller 205 creates an audio file according to the format shown in FIG. 2, and records the created audio file in the recorder 202 (S207). The controller records the recording start/end time and time per one track into the header of the audio file, and associates the data with the image file of the camera 100 in a later step. The header may record the number of divided tracks, and the capacity per one track.

After creating an audio file, the controller 205 determines whether the user has issued an instruction to turn off the power through the operation module 206 (S208). If the user has issued an instruction to turn off the power, the controller 205 finishes the control of the IC recorder. If the user has not issued an instruction to turn off the power, step S201 is executed.

If the operation mode of the IC recorder is not recording mode, the controller 205 determines whether the operation mode of the IC recorder 200 is playback mode (S211). If the operation mode is not playback mode, step S201 is executed. If the operation mode is playback mode, the controller 205 determines whether the main body 120 of the camera 100 is connected (S212). If the main body 120 is not connected, the controller 205 causes the reproduction module 204 to display an audio file list recorded in the recorder 202 (S213). After the audio file list is displayed, the controller 205 determines whether the user selects an audio file through the operation module 126 (S214). If the user does not select an audio file, step S224 is executed. If the user selects an audio file, the controller 205 reads the selected audio file from the recorder 202, and causes the reproduction module 204 to play back the audio data based on the read audio file (S215). In this case, if the selected audio file is a container file including an image file, the controller 205 reproduces also the image file in synchronization with the reproduction of the audio file. After the selected audio file is reproduced, step S224 is executed. If the main body 120 is connected, the controller 205 determines whether the camera 100 has requested the header data be sent (S216). If the camera 100 has requested the header data be sent, the controller 205 sends the camera 100 the data recorded in the header of the audio file recorded in the recorder 202 (S217). For example, the controller 205 sends data such as a recording start/end time and a recording time per one track. Thereafter, the controller 205 determines whether the camera has requested divided audio data be sent (S218). If the camera has not requested divided audio data be sent, step S224 is executed. If the camera has requested divided audio data be sent, the controller 205 sends the corresponding divided audio data to the camera 100 (S219). Thereafter, the controller 205 determines whether an image file has been received from the camera 100 (S220). If an image file has not been received, the controller 205 executes step S220, and waits. If an image file has been received, the controller 205 correlates the selected audio file to the received image file (S221). This correlation is performed by re-recoding the audio file and image file in the format of a moving image container file. The details will be described later. After creating a moving image container file, the controller 205 determines whether thumbnail image data has been received from the camera 100 (S222). If thumbnail image data has not been received, the controller 225 executes step S222, and waits. If thumbnail image data has been received, the controller 205 records the thumbnail image data in the header of the audio file in the moving image container file as shown in FIG. 2 (S223). Thereafter, step S224 is executed.

In step S224, the controller 205 determines whether the user has issued an instruction to finish reproduction through the operation module 206 (S224). If the user has not issued an instruction to finish reproduction, step S212 is executed. If the user has issued an instruction to finish reproduction, step S208 is executed.

Figure 6A:
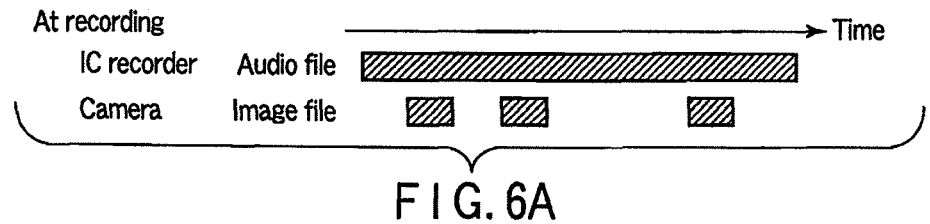
FIG. 6A is a diagram showing the relationship between an audio file recorded in the IC recorder and an image file recorded in the camera.
Figure 6B:
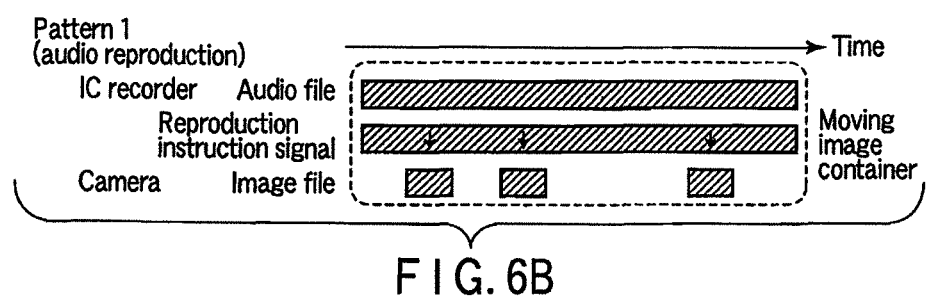
FIG. 6B is a diagram showing the relationship between an audio file and an image file, when audio data is mainly reproduced.

If the still image recording with the camera 100 is performed separately from the audio recording with the IC recorder 200, or if the cooperative recording in step S206 is not performed, the IC recorder 200 records an audio file including temporally-continued audio data, as shown in FIG. 6A. Actually, the audio data is recorded in units of the divided audio data shown in FIG. 2. On the other hand, the camera 100 records one or more temporally-discontinued still image files. Here, if an audio file is selected in the IC recorder 200, while the IC recorder 200 is being connected to the camera 100, the IC recorder 200 creates a moving image container file as a correlation of an audio file with an image file. FIG. 6B shows the correlation in the IC recorder 200. The moving image container file created by the correlation records the temporally-continued audio file shown in FIG. 6A and the image file sent from the camera 100, as one file. Further, the moving image container file records a reproduction instruction signal to indicate the timing of reproducing image data during reproduction of audio data. This timing coincides with an image shooting end time, for example. If reproducing an audio file that has become a moving image container file, the controller 205 reads a reproduction instruction signal, and reproduces an image file at the timing indicated by the reproduction instruction signal. Thumbnail image data may be reproduced.

The camera 100 may create a moving image container file, and send the created moving image container file.

Figure 6C:
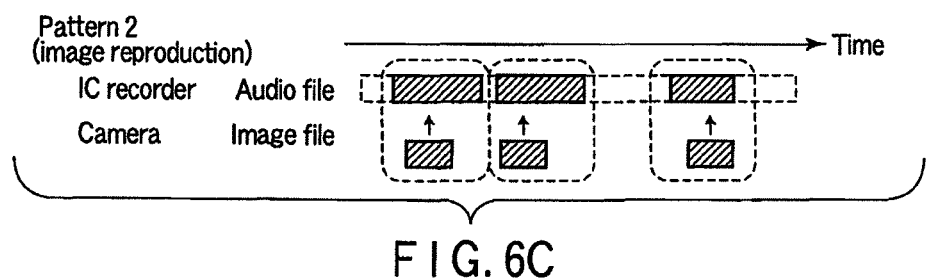
FIG. 6C is a diagram showing the relationship between an audio file and an image file, when image data is mainly reproduced.

If the camera 100 selects an image file, while the camera 100 is being connected to the IC recorder 200, the camera 100 correlates an audio file with an image file. FIG. 6C shows the correlation made the camera 100. In this case, the IC recorder 200 sends divided audio data, and header data of each divided audio data. By comparing the recording start/end time of the divided audio data in the header data with the shooting start/end time of each image file, the divided audio data sent from the IC recorder 200 is correlated with the image file. When an image file is reproduced, if there is divided audio data correlated to the image file, the controller 125 reproduces also the divided audio data.

As explained hereinbefore, according to the embodiment, even if image shooting with the camera 100 is performed separately from audio recording with the IC recorder 200, the camera 100 and IC recorder 200 can cooperate to effectively reproduce image and audio data. The IC recorder 200 creates a moving image container file according to an image file sent from the camera 100. By recording such a moving image container file, it is possible to reproduce a plurality of (or one) temporally-discontinued image files in synchronization with reproduction of temporally-continued audio files storing audio data. On the other hand, the camera 100 correlates divided audio data sent from the IC recorder 200 with an image file. Therefore, audio data can be reproduced for a required time only in synchronization with reproduction of a still image file in which data is recorded in a moment. Further, by recording a thumbnail image data in an audio file, an audio file is easily correlated with an image file by displaying a thumbnail image when an audio file is selected, for example.

Figure 7A:
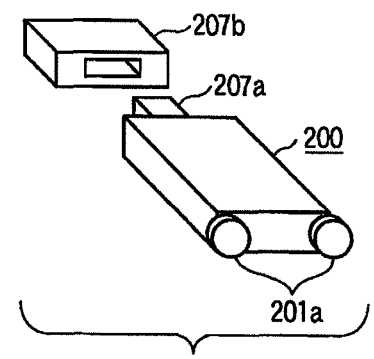
FIGS. 7A and 7B are diagrams showing cooperation between the camera and the IC recorder.
Figure 7B:
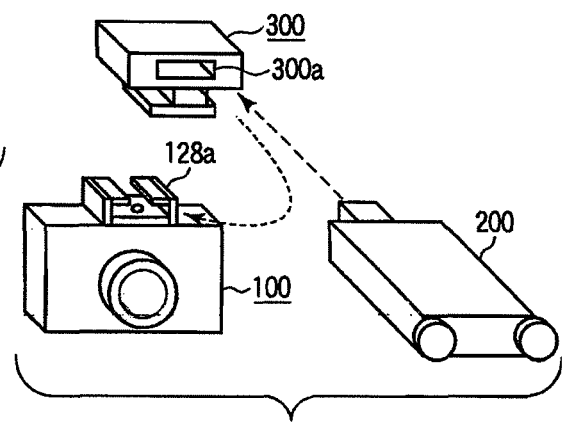

FIGS. 7A and 7B show an actual cooperation between the IC recorder and camera. FIG. 7A shows an external view of the IC recorder 200. A stereo microphone 201a is provided on the front of the IC recorder 200 as an audio recorder 201. An USB terminal 207a is provided on the back of the IC recorder 200 as an example of the communication module 207. The USB terminal 207a is usually protected by a terminal cap 207b. As shown in FIG. 7B, the camera 100 is provided with an accessory shoe 128a to fix an accessory 300 for making communication with the IC recorder 200. The accessory 300 is provided with an USB terminal 300a. The camera 100 and IC recorder 200 can be communicably connected by connecting the USB terminal 300a and the USB terminal 207a of the IC recorder 200, and fixing the accessory 300 to the accessory shoe 128a of the camera 100. Of course, FIGS. 7A and 7B show an exemplary connection. The camera 100 and IC recorder 200 may be communicably connected in other various forms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
 a first recorder which records an image file obtained by image shooting;
 an interface which is connected to an external device and is configured to receive audio data from the external device, the external device records an audio file comprising audio data that is divided into a plurality of audio tracks by units of time; and
 a controller configured to perform the following:
 (1) correlate the image file with at least one audio track of the plurality of audio tracks by comparing time data of the image file and time data of the at least one audio track,
 (2) send reduced image data obtained by reducing images included in the image file to the external device through the interface,
 (3) play back the image file simultaneously with its correlated at least one audio track, and
 (4) update the image file with correlation data.

2. The imaging device according to claim 1, further comprising a reproduction module configured to play back the image file simultaneously with its correlated at least one audio track.

3. The imaging device according to claim 1, wherein the image file is a still image file.

4. A system for image recording and audio recording, comprising:
- an imaging device configured to record an image file;
- an audio recording device configured to record an audio file, the audio file comprising audio data that is divided into a plurality of temporally-continued audio data tracks;
- an interface connected to the imaging device and audio recording device;
- a first controller configured to correlate an image file with at least one temporally-continued audio data track of the plurality of temporally-continued audio data tracks so that the image file and the at least one temporally-continued audio data track are synchronized, based on time data of the image file, and corresponding time data of the at least one temporally-continued audio data track;
- a second controller configured to create a moving image container file configured to always be replayable by combining the image file and the at least one temporally-continued audio data track;
- a first recorder which adds correlation data representing the correlated image file and the at least one temporally-continued audio data track to the image file, and records the image file; and
- a second recorder configured to record the moving image container file.

5. The system according to claim 4, further comprising:
- a first reproduction module which reproduces the image file in the moving image container file in synchronization with reproduction of the at least one temporally-continued audio data track in the moving image container file; and
- a second reproduction module which reproduces the at least one temporally-continued audio data track in synchronization with reproduction of the image file, to which the correlated data is added.

6. The system according to claim 5, wherein the image file is a still image file.

* * * * *